(12) United States Patent
Giovacchini et al.

(10) Patent No.: US 12,240,108 B2
(45) Date of Patent: Mar. 4, 2025

(54) SYSTEM FOR ASSISTING AN OPERATOR IN EXERTING EFFORTS

(71) Applicant: IUVO S.R.L, Pontedera (IT)

(72) Inventors: Francesco Giovacchini, Pontedera Pisa (IT); Matteo Moise, Pontedera Pisa (IT); Giulio Proface, Pontedera Pisa (IT); Luca Morelli, Pontedera Pisa (IT); Nicola Vitiello, Pontedera Pisa (IT)

(73) Assignee: IUVO S.R.l., Pontedera (IT)

( * ) Notice: Subject to any disclaimer, the term of this patent is extended or adjusted under 35 U.S.C. 154(b) by 728 days.

(21) Appl. No.: 17/594,312

(22) PCT Filed: Apr. 22, 2020

(86) PCT No.: PCT/IB2020/053821
§ 371 (c)(1),
(2) Date: Oct. 11, 2021

(87) PCT Pub. No.: WO2020/217191
PCT Pub. Date: Oct. 29, 2020

(65) Prior Publication Data
US 2022/0161415 A1    May 26, 2022

Related U.S. Application Data

(60) Provisional application No. 62/836,967, filed on Apr. 22, 2019.

(51) Int. Cl.
*B25J 9/00* (2006.01)
*A61H 1/02* (2006.01)

(52) U.S. Cl.
CPC .......... *B25J 9/0006* (2013.01); *A61H 1/0281* (2013.01); *A61H 2201/0176* (2013.01);
(Continued)

(58) Field of Classification Search
CPC ........ B25J 9/0006; B25J 9/102; A63B 21/00; A61H 2201/0176; A61H 2201/1215; A61H 2201/1614; A61H 2201/1676
See application file for complete search history.

(56) References Cited

U.S. PATENT DOCUMENTS 4,612,919 A * 9/1986 Best ...................... A61F 5/0123
602/16
9,299,230 B2 * 3/2016 Aviles ...................... G08B 6/00
(Continued)

FOREIGN PATENT DOCUMENTS

EP    2948276 A2    12/2015
WO   2019016629 A1    1/2019

OTHER PUBLICATIONS

International Search Report with Written Opinion from PCT Application No. PCT/IB2020/053821, Jun. 30, 2020.

*Primary Examiner* — Samchuan C Yao
*Assistant Examiner* — Mishal Zahra Hussain
(74) *Attorney, Agent, or Firm* — Workman Nydegger (57) ABSTRACT

A system for assisting an operator in exerting efforts comprises a frame having one or more degrees of freedom and supporting a compensation device arranged to provide assistive forces to a joint of the operator. The compensation device comprises a regulation device comprising a motor arranged to adjust a degree of tension in an elastic mechanism. The regulation device receives instructions from a control system based on information obtained from an encoder or the operator's preferences recorded at a control panel.

19 Claims, 7 Drawing Sheets

(52) U.S. Cl.
CPC ........ *A61H 2201/0192* (2013.01); *A61H 2201/1215* (2013.01); *A61H 2201/1614* (2013.01); *A61H 2201/1619* (2013.01); *A61H 2201/1623* (2013.01); *A61H 2201/1628* (2013.01); *A61H 2201/1638* (2013.01); *A61H 2201/165* (2013.01); *A61H 2201/1676* (2013.01)

(56) References Cited

U.S. PATENT DOCUMENTS

| | | | |
|---|---|---|---|
| 9,737,374 B2 * | 8/2017 | Doyle | B25J 9/0006 |
| 2003/0223844 A1 * | 12/2003 | Schiele | A63B 23/12 |
| | | | 414/5 |
| 2012/0184880 A1 | 7/2012 | Doyle | |
| 2015/0040712 A1 * | 2/2015 | Yamaguchi | F16F 15/363 |
| | | | 901/48 |
| 2017/0203432 A1 * | 7/2017 | Andrianesis | A61F 5/013 |
| 2019/0343710 A1 * | 11/2019 | Lerner | A61H 3/00 |
| 2019/0365554 A1 * | 12/2019 | Davies-Sekle | A61H 1/0281 |
| 2020/0281796 A1 * | 9/2020 | Lakany | A61H 1/0277 |

* cited by examiner

SYSTEM FOR ASSISTING AN OPERATOR IN EXERTING EFFORTS

FIELD OF THE DISCLOSURE

The disclosure relates to a system for a human body in an exoskeleton, and for supporting assistive devices adapted to augment an operator's performance, mitigate repetitive strain injuries, and/or assist in exerting efforts.

BACKGROUND

Wearable industrial exoskeleton technologies can improve endurance and safety in industrial settings. These exoskeletons increase industrial productivity and can prevent common workplace injuries by minimizing the overuse of muscles and tendons. Exoskeletons can bring support to and augment an operator during strenuous activities, including lifting, stooping, bending, squatting, and overhead work, to reduce employee fatigue and workplace injuries. Exoskeletons may be additionally valuable in repetitive and/or awkward activities. Exoskeleton operators can effortlessly hold heavy hand tools, increasing productivity and accuracy by reducing muscle fatigue. Older workers with valuable experience and intuition may, through an exoskeleton system, be able to work longer than they otherwise could in physically demanding or challenging jobs.

An exoskeleton system may be arranged to transfer loads through the exoskeleton to the ground in standing or kneeling positions, and allow operators to use heavy tools as if they were weightless. The exoskeleton system can be configured to move naturally with the body and adapts to different body types and heights. The exoskeleton system can replicate the dynamic movement of the shoulder while the interface can enwrap the operator's body like a second skin.

An exemplary exoskeleton system is arranged for the upper body, including the shoulder and arms by enhancing performance by reducing forces at the shoulder (e.g., gravitational forces that urge the arms downward), and enabling the operator to perform chest-to-ceiling level tasks for extended periods, with less effort. The exoskeleton may assist the operator in elevating and supporting the operator's arms and can reduce physical risks and discomfort from tasks carried out above chest height or overhead.

It has been found that lower body, trunk, and upper body regions could benefit from active exoskeletons. Muscle-activity reductions have been reported as an effect of active exoskeletons. Exoskeletons have the potential to reduce the underlying factors associated with work-related musculoskeletal injury considerably. While certain exoskeletons are available, several technical issues hinder practical use of exoskeletons in industry. Specific problems include discomfort for passive and active exoskeletons, the weight of the device, alignment with human anatomy and kinematics, and detection of human intention to enable smooth movement for active exoskeletons.

Another issue ensures that the assistance provided by the exoskeleton system is commensurate with the operator's particular needs and activities. Existing passive systems may provide static or non-dynamic assistive forces, poorly suiting specific movements, postures, or operators. Different operators may utilize exoskeleton systems in subsequent shifts. Still, existing exoskeleton systems are insufficiently adaptable to the operators' specific dimensions, strength, and tasks, leading to poor compliance and poor results across different operators. Existing exoskeleton devices may be poorly adapted to allow an operator to perform unrelated tasks and must be doffed if such tasks are to be comfortably and effectively performed.

The embodiments of this disclosure aim to overcome these technical issues and provide exoskeleton solutions with an improved exoskeleton system that can overcome existing problems and lead to broader adoption by industry.

SUMMARY

Embodiments of the system of the disclosure relate to a passive or pseudo-passive exoskeleton system for relieving a load on a joint, for example, a shoulder, and for assisting to an operator's effort. The embodiments of the present disclosure provide an improvement over the prior art solutions discussed above, in particular from the standpoints of ergonomics and convenience of use.

Specifically, the embodiments of the system rely on the principle of a passive assistive exoskeleton having an active adjustment or regulation mechanism using an elastic mechanism arranged to generate a torque proportional to the elevational angle of a joint, such as an operator's arm. According to the embodiments, the active adjustment or regulation mechanism is configured to modify a distance between two extremities of the elastic mechanism to pretension or tension the elastic mechanism among a plurality of predetermined tension settings, and consequently a level of assistance provided by the exoskeleton. The elastic mechanism may be spring based, including at least one elastic spring element. An adjustment or regulation device may be motor driven and operatively connected to a control system to selectively and automatically tension the elastic mechanism based on operator input and sensor feedback.

According to an embodiment, a system for assisting an operator in exerting efforts comprises a garment that can be worn by the operator. The garment engages mutually mobile parts of a joint of the operator. It has a mobile frame that defines at least one axis of rotation, which assumes a position corresponding to the joint of the operator. A compensation device is carried by the garment and/or the frame and operable to compensate resistive moments acting on the joint during the effort exerted by the operator. The garment is optional and the exoskeleton may be used without such garment.

The compensation device comprises a first rotatable member and a second rotatable member, which are connected and are brought into relative motion about a first axis of rotation because of the movement of the joint of the operator's body. The second rotatable member can rotate about a second axis of rotation. The elastic mechanism has at least one elastic element, arranged for acting on the second rotatable member to impart on the first axis of rotation a moment opposite to the resistive moments. The first and second rotatable members and the elastic mechanism are mutually prearranged in such a way that, in at least one pre-set position of the joint, the force exerted by the elastic mechanism on the second rotatable member is oriented in a direction incident to the second axis of rotation of the second rotatable member.

The mobile frame may comprise a first portion and a second portion mutually mobile about the first axis of rotation.

The first rotatable member may be a gear wheel, fixedly mounted on the first portion and aligned with the first axis of rotation. The second rotatable member is a gear wheel, fixedly mounted on the second portion, and rotatable about the second axis of rotation and mobile according to a motion of revolution about the axis of rotation. The elastic mechanism engages the second rotatable member, exerting a linear force on an eccentric point of the second rotatable member.

The elastic mechanism may comprise a battery of springs, so a second end of the elastic mechanism is adjustable for setting the pre-tensioning of the elastic mechanism. The battery of springs may be connected to first and second brackets, wherein the first bracket is mounted on the eccentric point of the second rotatable member, and a second bracket is mounted on the second portion.

A regulation device may be connected and adapted to regulate tension in the elastic mechanism. As at least one sensor is connected to the regulation device and the regulation device is arranged to be operated according to at least one measurement by the at least one sensor, the regulation device may be controlled to provide a more precise level of tension. The regulation device is arranged for pre-tensioning or generally tensioning the elastic mechanism at a plurality of discrete or varied tension settings, and for placing the tension at one of the plurality of discrete tension settings. The plurality of discrete tension settings may correspond or be selected according to the operator's dimensions, posture, strength, and/or tasks, optimizing the operator's productivity and comfort.

According to a preferred embodiment, the control system includes a power source and power management of a motor, such as a servomotor, which adjusts the tension of the elastic mechanism. An encoder and an inertial measurement unit may be used to measure movement and angular rotation of the active mechanism. Other sensors may be provided to measure operator movement and performance, and such measurements may regulate the regulation device.

The regulation device may include an interface mechanism or control panel allowing the operator to adjust the compensation device selectively. The regulation device and control system can read and process signals coming from onboard sensors, such as the encoder and inertial measurement unit, and/or other sensors wearable or not, to process data and to send/receive information to/from external systems.

This arrangement allows the system to deduce and accommodate the physical status of the operator e.g., to preserve the operator from excessively strenuous activities and/or for suggesting or directly setting/modify the proper level of assistance. A control panel, such as one having communication means, such as pushbuttons, can communicate information to the operator, such as through a different color code or different blinking modalities, and to receive inputs from the operator.

The system may be designed for a shoulder joint of the operator, wherein the pre-set position corresponds to a position of the arm extending along the operator's side. The first and second rotatable members may define a motion-transmission ratio defined because the elastic mechanism determines, on the first axis of rotation, a maximum moment in the position of the arm projected forwards at 90°. The first and second rotatable members may have a transmission ratio that is variable as a function of the angle of rotation about the first axis of rotation.

These and other features, aspects, and advantages of the present disclosure will become better understood regarding the following description, appended claims, and accompanying drawings.

The drawing figures are not necessarily drawn to scale, but instead, are drawn to provide a better understanding of the components thereof, and are not intended to be limiting in scope, but to provide exemplary illustrations.

DETAILED DESCRIPTION OF VARIOUS EMBODIMENTS

A better understanding of different embodiments of the disclosure may be had from the following description read with the drawings in which like reference characters refer to like elements.

While the disclosure is susceptible to various modifications and alternative constructions, certain illustrative embodiments are shown in the drawings and are described below. It should be understood; however, there is no intention to limit the disclosure to the specific embodiments disclosed, but on the contrary, the aim is to cover all modifications, alternative constructions, combinations, and equivalents falling within the spirit and scope of the disclosure.

The references used are provided merely for convenience and hence do not define the sphere of protection or the embodiments.

The system described is a system, for example, an exoskeleton system, for assisting an operator in exerting efforts, of the type comprising:
   a garment that can be worn by the operator, which is to engage, when worn, the mutually mobile parts of a joint of the operator and which defines at least one axis of rotation to assume a position corresponding to the joint; the garment is optional; and
   a compensation device carried by the garment and designed to operate to compensate for the resistive moments that act on the joint during the effort exerted by the operator.

The system described has been devised, referring to applications for assisting the operator in efforts involving the shoulder joint. As seen in what follows, the same principles set forth may also be applied for systems for assisting the operator in efforts involving other joint groups or other joints, such as the hip joint or the knee joint.

The system described is characterized in that the compensation device comprises:
   a first rotatable member or gear and a second rotatable member or gear, which are connected and are brought into relative motion about the axis of rotation because of the movement of the joint of the operator's body, wherein the second rotatable member is rotatable about its axis; and an assembly or elastic mechanism equipped with one or more elastic elements, which is prearranged for acting on the second rotatable member to impart on the axis of rotation a moment opposite to the resistive moments;

wherein the first and second rotatable members and the assembly are mutually prearranged in such a way that, in at least one pre-set position of the joint, the force exerted by the assembly on the second rotatable member is oriented in a direction incident regarding the axis of rotation of the second rotatable member.

In the pre-set position referred to above, the elastic mechanism can impart no moment of compensation on the axis of rotation of the system.

The aforesaid pre-set position hence corresponds to a neutral position of the system, in which the operator receives no impulse on the joint.

Preferably, in the application to the shoulder joint, the above-mentioned neutral position is made to correspond to the position of the arms extending along the torso. In the application to the hip joint, the neutral position is made, instead, to correspond to the upright position of the operator.

The present applicant has found that the possibility for the system to identify such a neutral position constitutes a fundamental characteristic for guaranteeing adequate comfort for the operator, above all for the person who, wearing the system, must perform a range of tasks not all linked, for example, to raising of the arms.

The system described herein is hence suited for constituting a system that can be worn by the operator for the entire work shift, with the convenience for the operator to put it on just once when getting dressed at the start of the shift without doffing the system to perform ancillary tasks unrelated to the functions of the system.

Once again in the perspective of improving comfort for the operator, in various preferred embodiments, the elastic mechanism of the system is provided with a system for adjustment of the tensioning or pre-tensioning of the elastic mechanism. This system enables the operator to choose a desired assistance, possibly, to even exclude the assistance altogether, for example, during a prolonged pause from the work shift. The system for adjustment of the tensioning of the elastic mechanism may further allow the system to be interchangeable between or worn by multiple operators, e.g., during successive shifts, and who by operators who may have different dimensions, abilities, or tasks to perform.

As seen in what follows, in various preferred embodiments, the system described has a system of axes of movement, which can assist and follow in a precise and fluid way practically all the movements of the joint and of the possible joint group or girdle to which the joint belongs.

This system of axes of movement has proven to render the system of assistance optimal from the ergonomic standpoint, and increase further the perception of comfort by the operator.

Embodiments of the system for assisting an operator in exerting efforts may comprise a garment arranged to be worn like an article of clothing and to support a mobile frame. The mobile frame may be arranged to define an assisted axis of motion of the system and to define one or more degrees of freedom allowing the system to approximate the operator's movements closely. The mobile frame may attach to the garment by and comprise linear guides arranged at the operator's back and proximate the operator's scapulae for close conformity with the operator's unique dimensions and strength and based on the operator's current task.

The linear guides may define axes of translation relative to the operator. They may support a compensation device comprising articulated elements that define an assisted axis of rotation of the system. The articulated elements may define first and second axes of rotation corresponding to abduction/adduction of the arm and rotation of the shoulder, respectively. The third axis of rotation defined by the articulated elements corresponds to the assisted axis of rotation of the system about which an assistive torque is provided to augment and assist efforts of the operator.

The articulated elements may comprise first and second gear or rotatable members that move about the assisted axis of rotation in response to movement of the operator's arm. The articulated elements may comprise an assembly comprising an elastic mechanism arranged to provide a moment about the second rotatable member and compensating resistive moments, e.g., gravitational forces, that act on the joint, e.g., a shoulder joint, during movements of the operator.

In embodiments, the elastic mechanism may be supported by brackets arranged in the articulated element, so as the operator's joint moves and generates rotation about the third axis of rotation, the first rotatable member is caused to rotate. The rotation of the first rotatable member causes rotation of the second rotatable member and adjusts the tension in the elastic mechanism. The increased or decreased tension in the elastic mechanism is then transferred or transmitted through the second rotatable member to the first rotatable member, influencing the operator's joint, e.g., to make raising the operator's arm from a neutral position easier. The tension may be transmitted from the second rotatable member to the first rotatable member according to a gear reduction ratio of the first and second rotatable members. The ratio is chosen, so the torque applied to the operator's joint has a profile similar to that caused by gravity; for example, the torque profile generated by the gear reduction ratio may have a maximum value at 90 degrees.

One bracket of the elastic mechanism may be mounted eccentrically on the second rotatable member, so the force applied by or transferred from the elastic mechanism to the operator depends on the angle of rotation of the second rotatable member. The components may be arranged in a predetermined fashion to generate the desired torque at desired arm positions; for example, an operator may be assisted in raising and keeping their arms above their head by the torque generated around the third axis of rotation by the elastic mechanism.

The degree of tension applied by the elastic mechanism may be manually adjusted or selected by way of a screw-operated or knob-type manual device, which may comprise discrete settings. The manual device may adjust a distance between the brackets, so tension in the elastic mechanism is adjusted independently of the rotation of the second rotatable member. An operator may select a desired tension.

Embodiments of the present disclosure advantageously provide an improved mechanism for selecting and adjusting tension in the elastic mechanism, as the degree of tension may vary dynamically during an operator's tasks and based on the dimensions and abilities of different operators.

Figure 1:
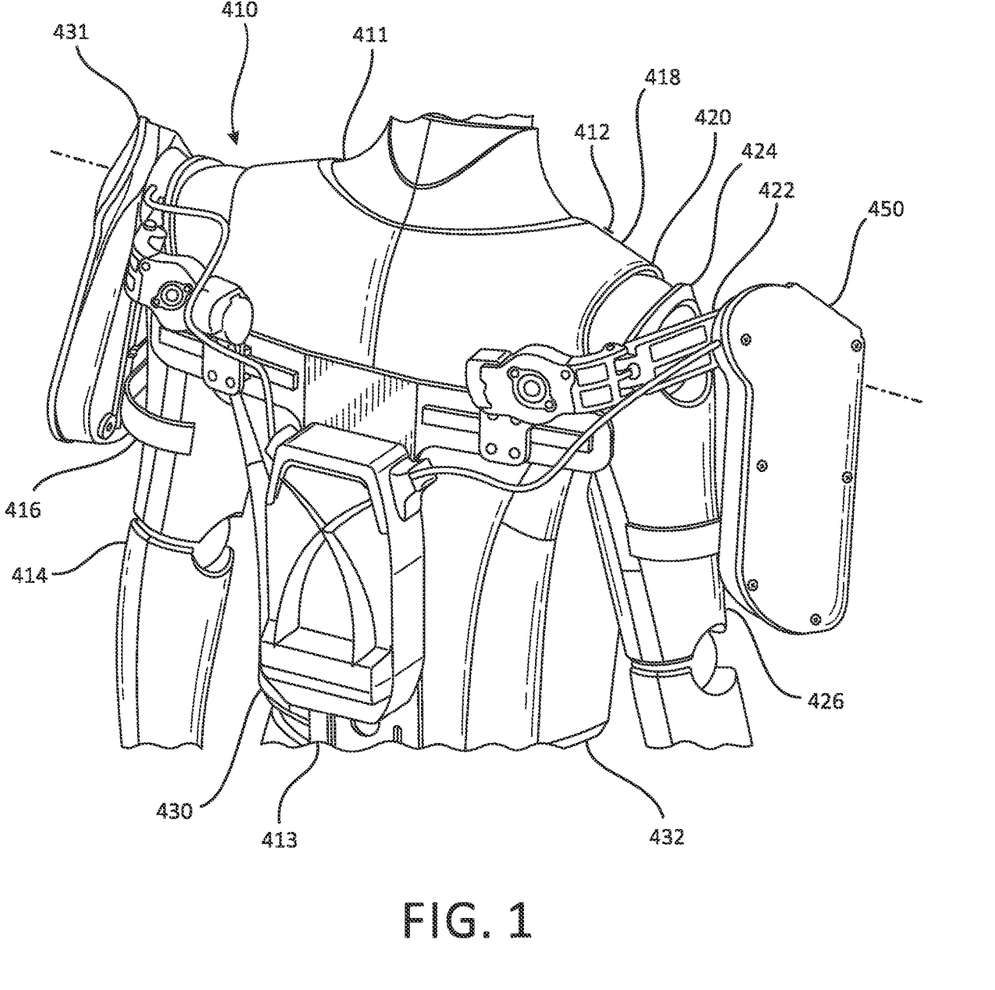
FIG. 1 is a partial perspective view of an exoskeleton system according to the disclosure.

As shown in FIG. 1, an exoskeleton system 410 for assisting an operator in exerting efforts may comprise a garment 412 that can be worn by an operator and arranged to assume a position corresponding to a joint of the operator. The garment 412 may additionally or be arranged as one or more straps extending about the operator to secure the exoskeleton system 410 to the operator. The garment is optional and the exoskeleton system may provided without such garment.

The exoskeleton system 410 may further comprise a compensation device 450 carried by or supported on the garment 412 and arranged to compensate resistive moments acting on the joint during the operator's efforts, such as the effects of gravity pulling the operator's arms down. In embodiments, the compensation device 450 may comprise a separate or distinct unit arranged at each arm of the operator and generally at the operator's upper arm or shoulder. In other embodiments, the compensation device 450 may be arranged centrally at the operator's back or at yet other locations. The compensation device 450 may function to assist an operator in exerting efforts, such as but not limited to, raising the arms, lifting or manipulating an object, pressing against a surface, holding the arms in the desired position, or other efforts.

The exoskeleton system 410 may comprise a frame 411 arranged to support at least the compensation device 450 on the operator. The frame 411 may comprise linear guides 414 extending proximate a user's scapulae and generally opposite each other from a spinal support portion 413. The spinal support portion 413 may attach to the garment 412 and/or by a lumbar support portion not shown. The frame 411 may be formed of a material having sufficient strength to support the compensation device 450 and to transfer forces as the operator engages in potentially physically demanding tasks. The frame 411 may additionally or be formed of a material with sufficient malleability to be adjusted or shaped to a particular operator's dimensions.

The compensation device 450 may attach to the frame 411 and the linear guides 414 in particular by sliding block assemblies 416. The sliding block assemblies 416 may be arranged to selectively translate along the linear guides 414 to adjust to the operator's unique dimensions, such as shoulder width and user height, for optimal comfort and compliance. The sliding block assemblies 416 may be arranged to lock at desired locations and be released to translate to a new location. The sliding block assemblies 416 may attach to abduction/adduction assemblies 418 at each arm, the abduction/adduction assemblies 418 arranged to provide a first degree of freedom and allow the operator to abduct/adduct the arm naturally.

First and second elements 420, 422 may connect the compensation device 450 to the abduction/adduction assemblies 418. The first and second elements 420, 422 may be hingedly joined at a joint arm 424 arranged to allow the operator to extend and flex the arm relative to the body in a second degree of freedom.

The compensation device 450 may attach to the operator's arm at a band 426, allowing the motion of the arm to activate a rotatable member of the compensation device 450, as described in greater detail herein. The depicted arrangement is not limiting, but alternative arrangements, movements, degrees of freedom, attachments, and components may be arranged to form a system according to the disclosure.

Figure 2:
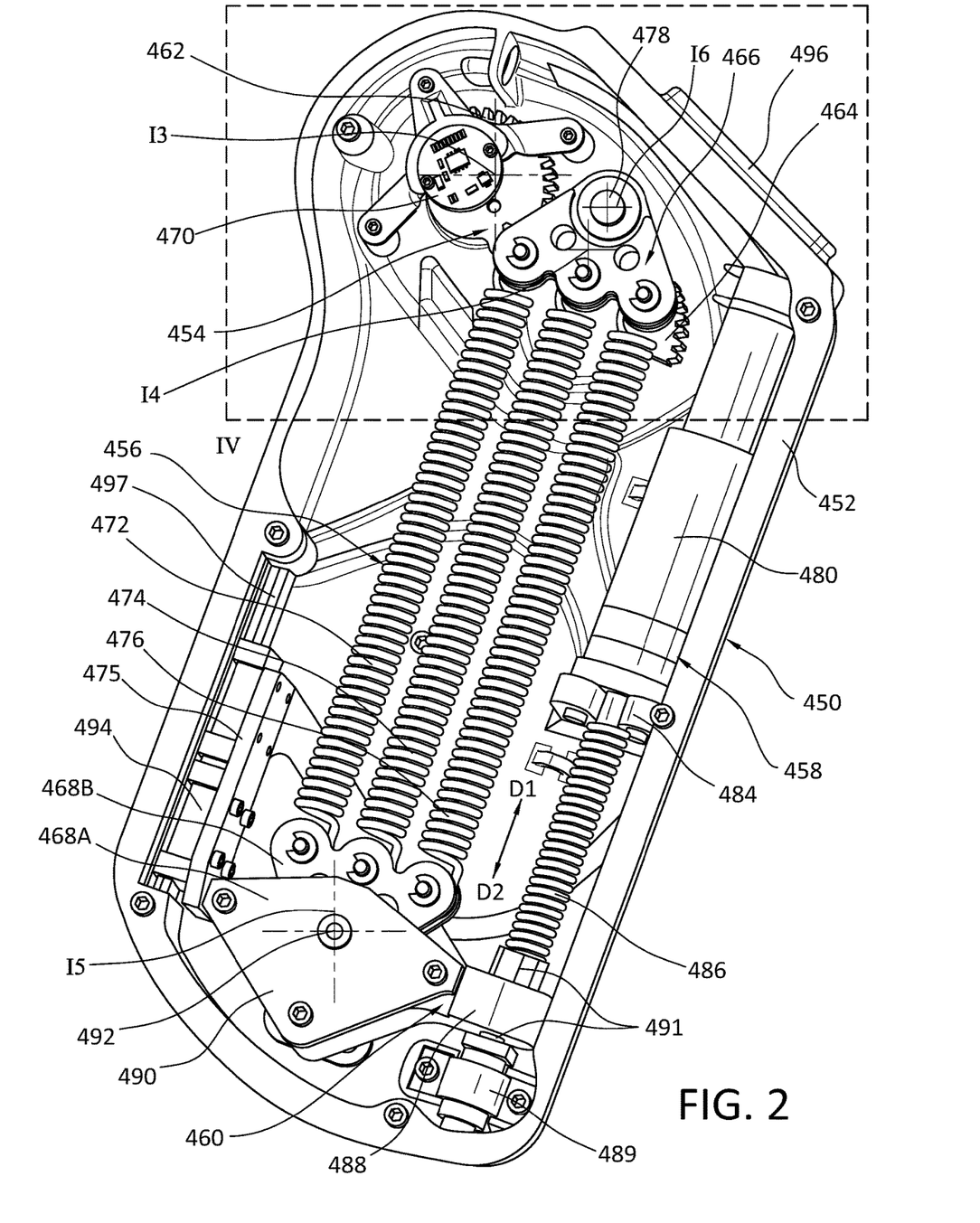
FIG. 2 is a plan view of the first side of an active mechanism in the exoskeleton system of FIG. 1 without a portion of a casing.
Figure 3:
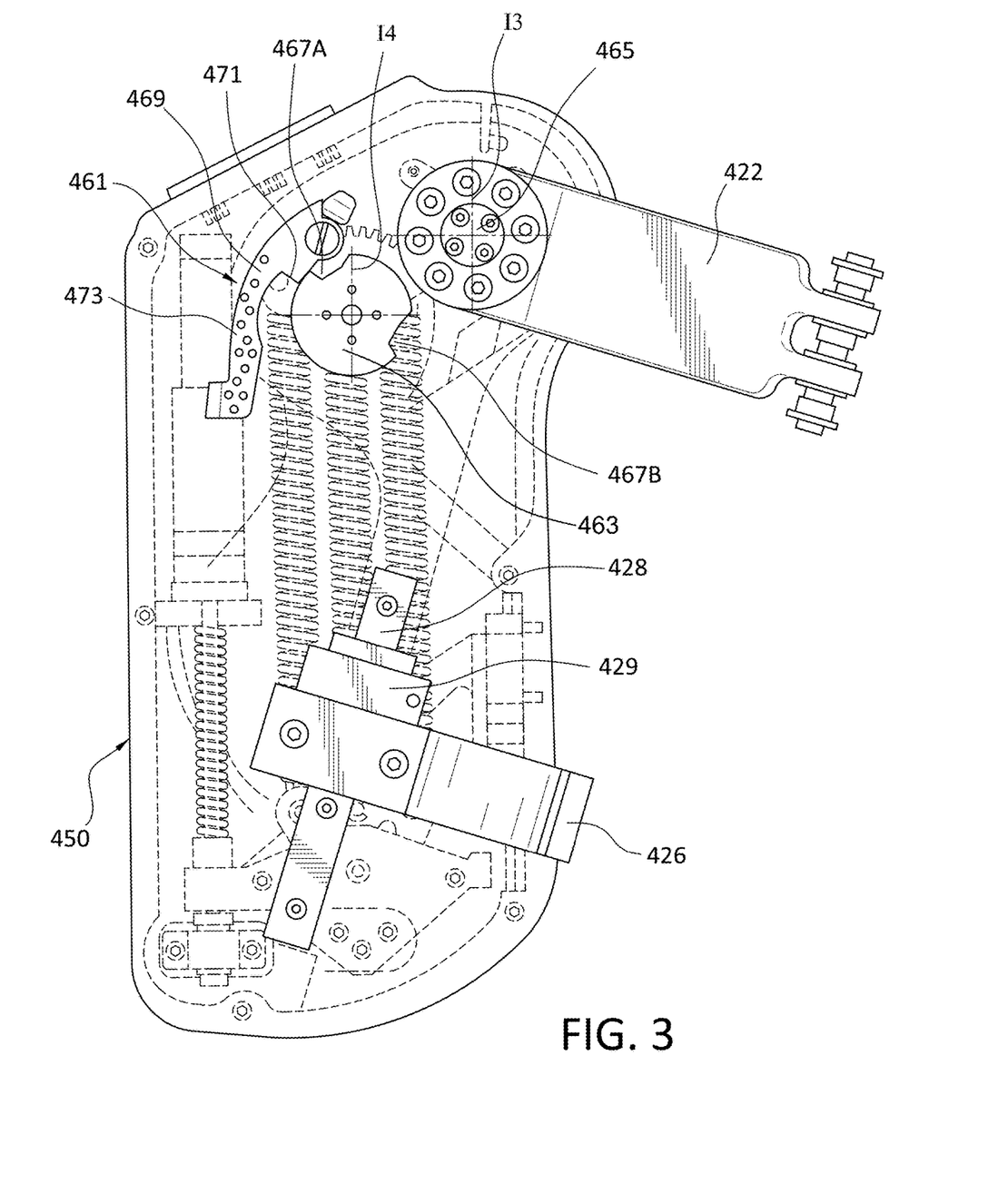
FIG. 3 is a plan view of a second side of the active mechanism of FIG. 2.
Figure 4:
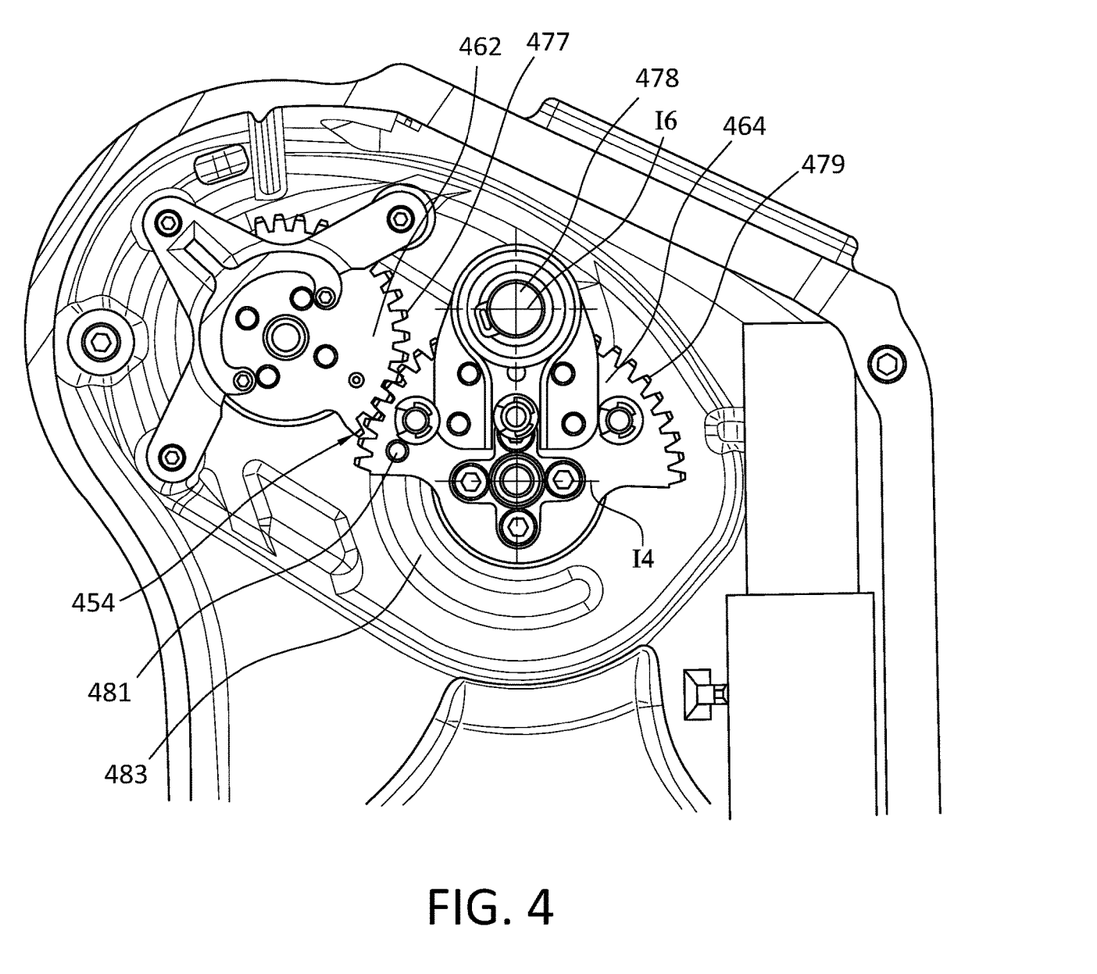
FIG. 4 is a schematic sectional view IV taken from FIG. 2.
Figures 5A, 5B:
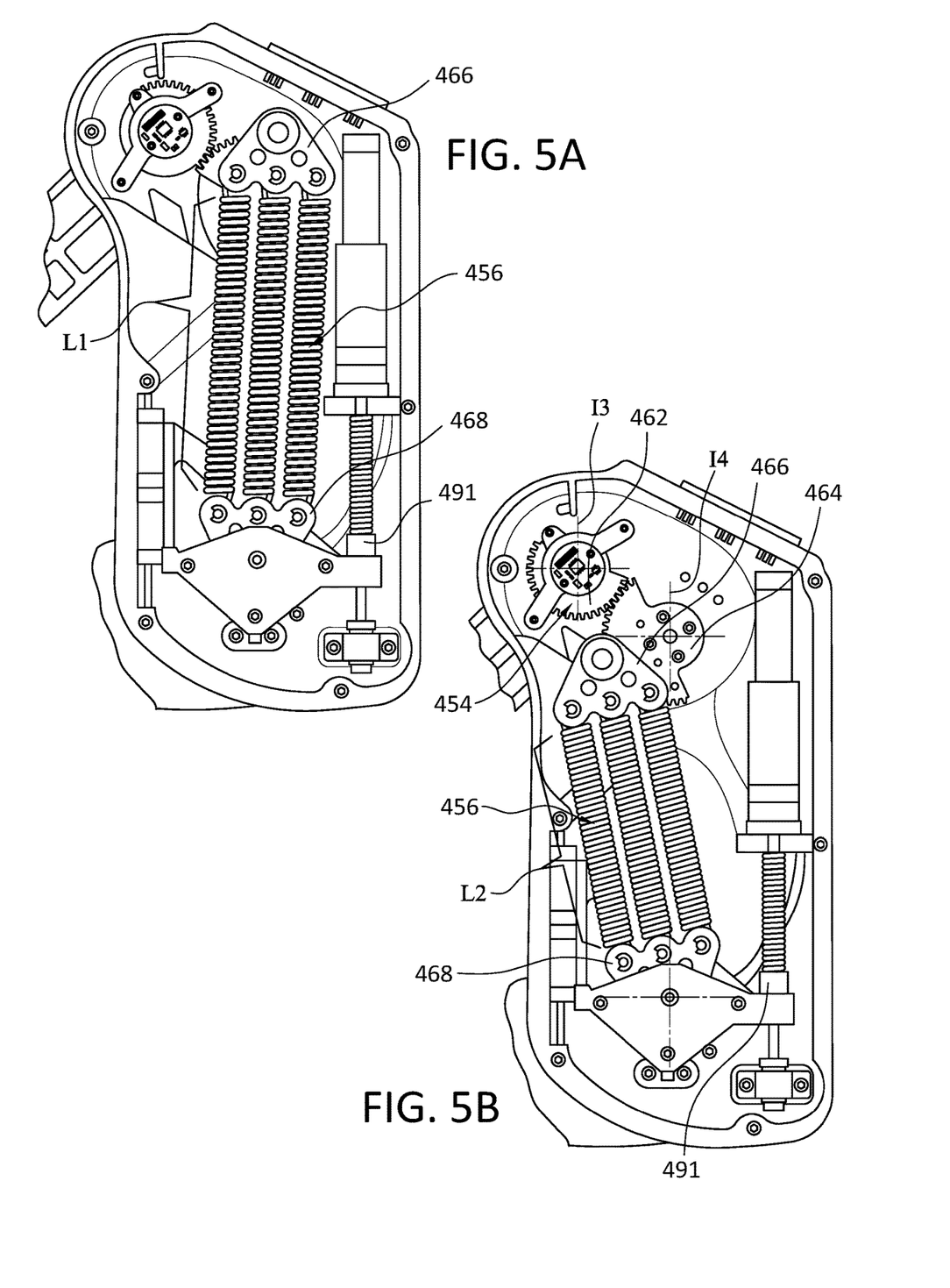
FIG. 5A is a schematic view of the active mechanism of FIG. 2 with the elastic mechanism in a first angular position.
FIG. 5B is a schematic view of the active mechanism of FIG. 2 with the elastic mechanism in a second angular position.

As seen in the embodiment of FIGS. 2-3, the compensation device 450 may comprise first and second rotatable members or gears 462, 464 housed within a casing 452. The second rotatable member 464 may engage and be rotatable relative to the first rotatable member 462 at an engagement portion 454. The first rotatable member 462 may be arranged to be brought into relative motion about a first axis of rotation I3 because of the movement of the joint of the operator.

The compensation device 450 may further comprise an elastic mechanism 456 having a first end connected to the second rotatable member 464 and arranged to impart at the first axis of rotation I3 a moment opposite the resistive moments, e.g., gravity pulling the operator's arms downward. The elastic mechanism 456 may comprise at least one spring 472, 474, 476 tensioned between first and second bracket assemblies 466, 468. The first bracket assembly 466 may pivotally connect to the casing 452 of the compensation device 450 by a pivot pin 478 extending through the pivot point 485. The pivot pin 478 allows the first bracket assembly 466 to rotate about a fourth axis of rotation I6. While the elastic mechanism is described as having one or more springs, the depicted embodiment is not limiting and may comprise any suitable component or combinations thereof.

The fourth axis of rotation I6 may be offset and parallel to a second axis of rotation I4 corresponding to the second rotatable member 464. By being located separately from the second axis of rotation I4, the first bracket assembly 466 may be arranged in a predetermined location for adjusting tension in the elastic mechanism 456 according to particular movements of the joint of the operator and throughout a range of allowed motion in the joint.

The system 410 may advantageously ascertain the movements and/or position of the joint of the operator by way of an encoder 470 arranged in the compensation device 450. The encoder 470 may comprise a sensor in communication with the first rotatable member 462 and may measure an angle of the joint of the operator. In an embodiment, the encoder 470 may be arranged coaxially with the first rotatable member 462 and reads or senses a rotation of an element, such as a magnet, attached to the first rotatable member 462. The first rotatable member 462 may rotate according to the second rotatable member 464 by contacting and rotating relative to the first rotatable member 462 at an engagement portion 454. The first and second rotatable members 462, 464 may define a plurality of corresponding teeth 477, 479 engaging one another.

The first rotatable member 462 may be formed as a shoulder gear or any suitable fixture. As the first rotatable member 462 rotates in response to movements of the operator's arm, the encoder 470 records and sends a signal comprising position information. The second rotatable member 464 is rotated. The casing 452 may define an arcuate groove 483 arranged to receive a guide pin 481. The guide pin 481 may extend from the second rotatable member 464 and into the arcuate groove 483 to define a predetermined path or rotation of the second rotatable member 464, which pivots about a pivot pin 478 relative to the casing 452 as the operator's arm moves. The arcuate groove 483 is arranged to define two end-strokes for the second gear and consequently for the range of motion of the assisted joint.

The exoskeleton system 410 may further comprise a regulation device 458 connected to a second end of the elastic mechanism 456 and arranged to adjust tension therein. The regulation device 458 may adjust a length L3, L4 of the elastic mechanism 456 between its first and second ends, for example, in response to a detection of a position of the operator's joint or by the operator's specified preferences.

The regulation device 458 may comprise a motor 480, such as a servomotor, arranged to linearly adjust a length of the elastic mechanism 456 by actuating a spindle axis or screw 485 that changes the length of a spring 486. The spring 486 may be connected at a first end of the spring 486 by a mount 484 to the motor 480 and a linkage assembly 460 including a first bracket 468A having a central portion 490 and a first portion 488 proximate a second end of the spring 486. The spring 486 may terminate at an end portion 489 at or proximate the casing 452, and more particularly at a spindle nut 491 fixed on the linkage assembly 460. The first bracket 468A may support an end of the elastic mechanism 456 and adjust tension as the position of the first bracket 468A relative to the second rotatable member 464 is adjusted. While the motor 480 is depicted actuating a screw 485 in a rotating manner, the depicted embodiment is not limiting, and any suitable arrangement may be used.

The system 410 can operate without the spring above. The outcome of the spindle drive can be the linear motion of the linkage assembly 460 due to the thread of the spindle nut 491 in FIG. 2. A goal of the spring 486, in this embodiment, is to reduce the load acting on the spindle axis, allowing to use a smaller and lighter spindle drive. The load on the spindle axis is lowered employing the spring 486 compressed between the spindle nut 491 and the wall of the mount 484 to which the spindle is fixed 484. Since the linkage assembly, 460 can glide on the casing 452 due to the rail 495 and slider 494, almost the whole load of the springs would be transmitted to the spindle axis. The tension of the springs 472, 472, 476, according to the level of assistance and the angle of the arm, can vary in a range of forces that would lead to a similar compression on the spindle screw. Through adding a proper spring 486, the action on the screw is balanced between traction and compression, and its absolute value lowered.

For example, as the screw 485 is rotated by the motor 480, it may function to move the linkage assembly 460 in a direction D2 away from the second rotatable member 464, and conversely in a direction D1 toward the second rotatable member 464 as the operator's needs may require, and as discussed in greater detail herein. The motor 480 may be provided with a sensor, such as an encoder, which may be arranged to communicate a position of the screw 485 to a control unit 430.

The linkage assembly 460 may include the first and central portions 488, 490 of the first bracket 468A. It may further comprise a pivot pin 492 arranged to extend through the first bracket 468A to pivotally secure the elastic mechanism 456 to the first bracket 468A about a third axis of rotation I5. The pivot pin 492 attaches a second bracket 468B supporting first, second, and third springs 472, 474, 476 of the elastic mechanism 456 to the first bracket 468A and allowing the first, second, and third springs 472, 474, 476 to be tensioned by the regulation device 458 while rotating according to the movement of the operator's arm.

The first bracket 468A may facilitate movement of the elastic mechanism 456 by translating relative to the casing 452 along a rail 495 with a slider 494 attached to the first bracket 468A as the motor 480 actuates the screw 485 to change a length of the spring 486 and thus the position of the linkage assembly 460. The slider 494 may attach to the rail 495 by and at the second portion 475 of the first bracket 468A. The system can work even without the spring. The outcome of the spindle drive is the linear motion of the linkage assembly 460 due to the thread in the spindle nut 491. An objective of the spring, in this embodiment, as mentioned, is to reduce the load acting on the spindle axis, allowing to use a smaller and lighter spindle drive.

As seen in greater detail in FIG. 3, the compensation device 450 may further comprise a rotational stop assembly 461 comprising both extension and flexion stops to define an allowed degree of motion of the compensation device 450. The rotational stop assembly 461 may be arranged to engage a follower 463 attached to the second rotatable member 464.

The follower 463 may define first and second notches or detents 467A, 467B arranged to engage a stop surface 471 when the maximum flexion and extension angles, respectively, have been reached. The stop surface 471 may comprise an arm 469 pivotally connected to the casing 452. The arm 469 may comprise a lever 473 arranged for pivoting the arm 469 for disengagement from the follower 463. The rotational stop assembly 461 and the elastic mechanism 456 may be arranged such that the compensation device 450 is inactive at a predetermined neutral or pre-set position at which compensation or forces are not provided to the operator's joint.

The rotational stop assembly can be used for safety, by securing the compensation device when not worn, to avoid a sudden release of the elastic energy. The safety lock can be voluntarily engaged, acting on the lever 473 only when the maximum extension angle is reached.

The compensation device 450 may be connected to a joint arm 422 of the frame 411 at a rotational element 465. The rotational element 465 may be arranged to permit rotation of the compensation device 450 relative to the joint arm 422 in a third degree of freedom for the operator.

The compensation device 450 further supports the band 426 for securing about the arm of the operator. The band 426 may be formed of any suitable material and may attach to the casing 452 in any suitable fashion. The casing 452 may further define a bar 428 along which the band 426 may be slidingly mounted. The bar 428 may be secured on the casing 452 by a guide 429. The sliding arrangement of the band 426 on the casing 452 allows the system 410 to be adjustable to the unique dimensions, needs, and tasks of individual operators. It yet further allows for better kinematic compatibility between the device and the user's movements.

As seen in FIGS. 5A-6B, the compensation device 450 offers improved assistance to an operator relative to existing exoskeleton devices in that the compensation device 450 provides for dynamic tensioning of the elastic mechanism 456 based on the position of the operator's joint as determined by the encoder 470 and operator feedback, thereby allowing the system 410 to meet the needs of different users having different dimensions and performing different tasks. In the state or condition of FIG. 5A, the elastic mechanism 456 has a first length L1 creating a first tension which may be compressed to a second length L2 and a second, reduced tension in the state of FIG. 5B. As seen, the elastic mechanism 456 may also vary in configuration based on a rotation of the second rotatable member 464 according to a position of the operator's joint.

Figures 6A, 6B:
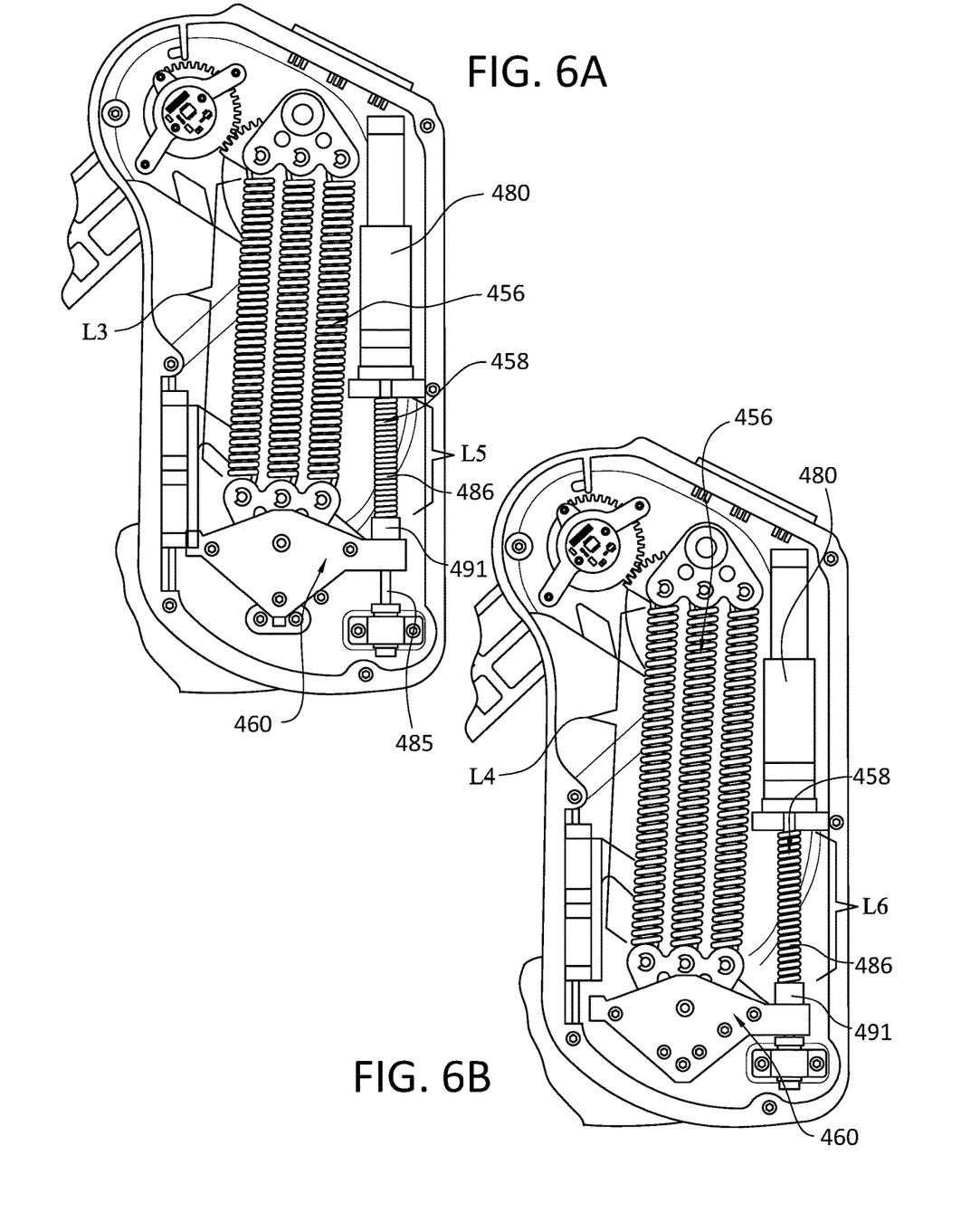
FIG. 6A is a schematic view of the regulation mechanism of FIG. 2 in a first position.
FIG. 6B is a schematic view of the regulation mechanism of FIG. 2 in a second position.

Based upon data from the encoder 470 and/or operator feedback obtained through a control system 430 as described in greater detail herein, the motor 480 may adjust the tension in the elastic mechanism 456 by actuating the screw 482 to change a length of the spring 485. In the example of FIG. 6A, the spring 486 may have a first length L5 such that the second linkage assembly 460 has a position relative to the casing 452 defining a length L3 of the springs 472, 474, 476 of the elastic mechanism 456. Based on the encoder 470 data or operator feedback, the motor 480 may be activated to change the length of the spring 486 to a second, increased length L6. The increased length L6 of the spring 486 causes the second linkage assembly 460 to translate relative to the casing 452, so the springs 472, 474, 476 of the elastic mechanism 456 have an increased length L4, increasing a degree of tension in the elastic mechanism 456 and assistance to the operator.

Figure 8:
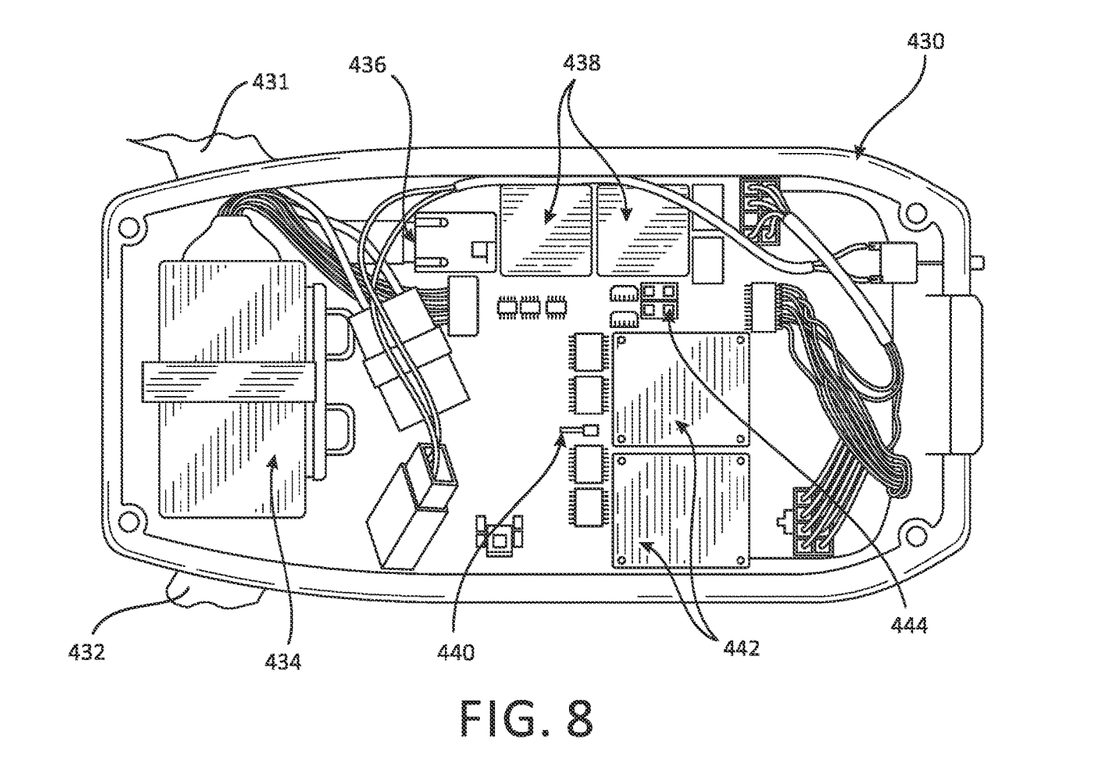
FIG. 8 is a detail view of exemplary components of the control system in the exoskeleton system of FIG. 1.

The exoskeleton system 410 may further comprise a control system 430 attached at the spinal support portion 413 of the frame 411. The control system 430 may be arranged to connect by cabling 431, 432 to the compensation device 450 at each arm, and to provide electrical power to the compensation device 450. The control system 430 may further adjust the tension in the elastic mechanism 456 in the compensation device 450.

Figure 7:
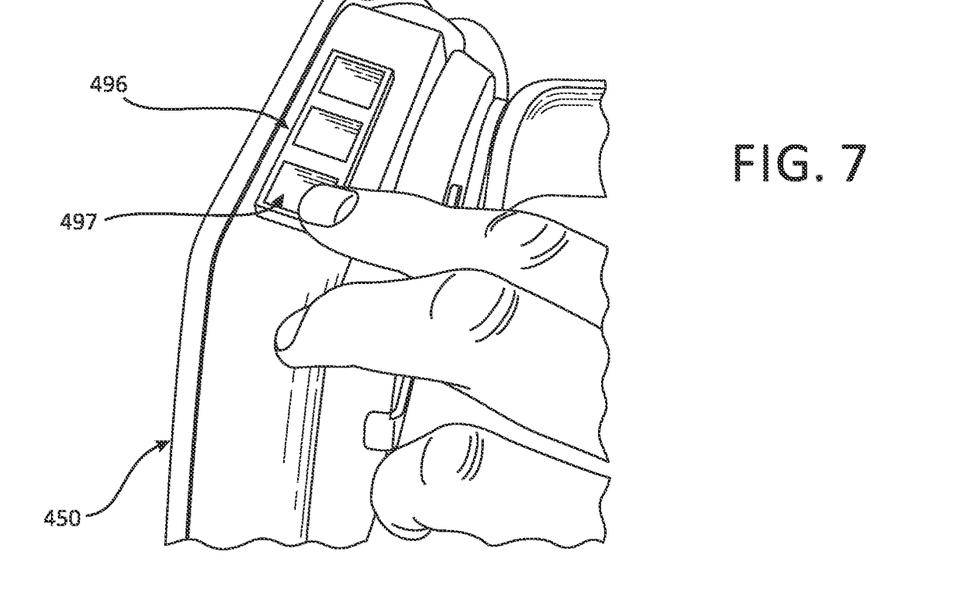
FIG. 7 is a schematic perspective view of a control panel in the active mechanism of FIG. 2.

The control system 430 may receive operator feedback via a control panel 496 arranged on the casing 452. The control panel 496 may be arranged as an interface between the operator and the system 410. It may comprise buttons 497 allowing the operator to specify one or more settings or saved preferences, for example. The control panel 496 may also communicate notifications to the operator; for example, the buttons 497 may be arranged with LEDs that can blink in predetermined patterns to indicate conditions or other information to the operator.

The control panel 496 may connect to the control system 430 at the spinal support portion 413. The control system 430 may comprise a battery 434 to actuate the motor 480 at least. The control system 430 may further comprise a router 436, power management unit 438, a digital zone comprising control logic 440, motor drivers 442, and an inertial measurement unit 444. The depicted arrangement and combination of elements is not limiting but rather may comprise any suitable arrangement of any suitable elements.

The inertial measurement unit 444 may be arranged to determine the overall trunk angles of the operator and may provide fall prevention/protection or otherwise optimize the operation of the compensation device 450. The control logic 440 may comprise an algorithm to specify a degree of actuation to the motor drivers 442, which may provide a signal to actuate the motor 480, so the tension in the elastic mechanism 456 is optimized for a particular operator at a particular moment. The power management unit 438 may serve to properly govern the distribution of power from the battery 434 to the motor 480. By providing the control system 430 including the battery 434 at the spinal support portion 413, the system 410 advantageously combines the benefits of passive exoskeleton devices which may provide easy-to-use and automatic assistance to a user with the benefits of active exoskeleton devices which may provide powered assistance and sensor control.

By providing a system for assisting efforts by an operator according to embodiments of the disclosure, the problem of the exoskeleton and other assist systems being poorly adapted to individual operators' unique dimensions, needs, and tasks is addressed, as the compensation device may be adapted to include a regulation device adjusting a degree of tension, and therefore assistance, provided to an operator based on both the operator's specified preferences and feedback and the position of the operator's joint. The system is thereby enabled to provide improved and more accurate assistance to the operator. The embodiments described further provide a system for assisting an operator in exerting efforts that provide improved ergonomics and ease of use, particularly through operating the compensation device to provide adjustable and discrete amounts of torque to aid an operator in performing certain effortful motions.

Without prejudice to the principle of the invention, the details of construction and the embodiments may vary, even significantly, regarding what has been illustrated purely by way of non-limiting example, without departing from the scope of the disclosure, as this is defined by the annexed claims.

While the disclosure discusses embodiments for the shoulder, embodiments of the disclosure may be used with other limbs, joints, and anatomical portions, including the torso, elbow, wrist/hand, hip, knee, and foot/ankle. Embodiments of the system may be used in other orthopedic, prosthetic, medical, and other devices, and are not limited to the embodiments shown.

Not necessarily all such objects or advantages may be achieved under an embodiment of the disclosure. Those skilled in the art will recognize that the disclosure may be embodied or carried out to achieve or optimize one advantage or group of advantages as taught without achieving other objects or advantages as taught or suggested.

The skilled artisan will recognize the interchangeability of various components from different embodiments described. Besides the variations described, other known equivalents for each feature can be mixed and matched by one of ordinary skill in this art to construct a hinge assembly under principles of the present disclosure. Therefore, the embodiments described may be adapted to systems for any suitable device, including orthopedic, prosthetic, medical, and other devices.

Although the system for assisting an operator in exerting efforts has been disclosed in certain preferred embodiments and examples, it, therefore, will be understood by those skilled in the art that the present disclosure extends beyond the disclosed embodiments to other alternative embodiments and/or uses of the system and obvious modifications and equivalents. It is intended that the scope of the present system disclosed should not be limited by the disclosed embodiments described above, but should be determined only by a fair reading of the claims that follow.

The invention claimed is:

1. An exoskeleton system arranged to be worn by an operator and assume a position corresponding to a joint of the operator, the exoskeleton system comprising:
   a compensation device operable to compensate resistive moments acting on the joint during an effort exerted by the operator, the compensation device comprising:
      a first rotatable member and a second rotatable member engaging the first rotatable member at an engagement portion and arranged to be brought into relative motion about a first axis of rotation as a result of movement of the joint of the operator, the second rotatable member rotatable about a second axis of rotation;
      an elastic mechanism defining a first end connecting to the second rotatable member to impart on the first axis of rotation a moment opposite to the resistive moments; and
      a regulation device connecting to a second end of the elastic mechanism for adjusting tension in the elastic mechanism by adjusting a length of the elastic mechanism between the first and second ends thereof;
   a motor connected to the elastic mechanism and arranged for linearly adjusting the length of the elastic mechanism;
   wherein the regulation device includes a linkage assembly having a first portion connected to the motor, a central portion pivotally connected to the elastic mechanism and a second portion slidably connected to a casing of the compensation device.

2. The exoskeleton system of claim 1, further comprising a control system connected to the motor for adjusting tension in the elastic mechanism.

3. The exoskeleton system of claim 2, further comprising an inertial measurement unit arranged to monitor a body posture of the operator.

4. The exoskeleton system of claim 2, wherein the control system has at least one connection providing power and control logic to the motor, the motor having a sensor arranged to communicate to the control system.

5. The exoskeleton system of claim 2, further comprising a control panel connecting to the control system and arranged on the compensation device and arranged for regulating the control system.

6. The exoskeleton system of claim 5, wherein the control panel has a display arranged to communicate information on the compensation device.

7. The exoskeleton system of claim 2, further comprising an encoder in communication with the first rotatable member, the encoder arranged to measure an angle of the joint and communicate the angle to the control system.

8. The exoskeleton system of claim 1, wherein the regulation device is electrically linked to a control panel arranged to selectively adjust tension in the elastic mechanism by adjusting a length of at least one elastic element of the elastic mechanism.

9. The exoskeleton system of claim 8, wherein the length of the at least one elastic element is adjusted by linear movement provided by the regulation device.

10. The exoskeleton system of claim 1, wherein the elastic mechanism includes a first bracket pivotally connecting about a pivot point to the second rotatable member about a fourth axis of rotation offset and parallel to the second axis of rotation.

11. The exoskeleton system of claim 1, further comprising a rotational stop assembly arranged to engage a follower connected to the second rotatable member at least at a maximum extension angle of the second rotatable member.

12. The exoskeleton system of claim 11, wherein the follower defines first and second detents arranged for a stop surface to engage depending on the follower rotating to the maximum extension angle, the stop surface defined by an arm pivotally connected to a casing of the compensation device and having a distal lever for pivoting the arm for disengagement from the follower.

13. The exoskeleton system of claim 1, further comprising a band adapted to secure about an arm of an operator, the band slidably mounted on a casing of the compensation device.

14. The exoskeleton of claim 13, wherein the band is slidable along a bar secured to the casing and fixable in place on the bar by a guide.

15. The exoskeleton system of claim 1, wherein the compensation device is connected to a joint arm by a rotational element arranged to permit rotation of the compensation device relative to the joint arm.

16. The exoskeleton of claim 1, wherein the first and second rotatable members having corresponding teeth engaging one another.

17. An exoskeleton system arranged to be worn by an operator and assume a position corresponding to a joint of the operator, the exoskeleton system comprising:
a compensation device operable to compensate resistive moments acting on the joint during an effort exerted by the operator, the compensation device comprising:
a first rotatable member and a second rotatable member engaging the first rotatable member at an engagement portion and arranged to be brought into relative motion about a first axis of rotation as a result of movement of the joint of the operator, the second rotatable member rotatable about a second axis of rotation;
an elastic mechanism defining a first end connecting to the second rotatable member to impart on the first axis of rotation a moment opposite to the resistive moments;
a control system connected to a regulation device for adjusting tension in the elastic mechanism;
a control panel connecting to the control system and arranged on the compensation device and arranged for regulating the control system; and
the regulation device connecting to a second end of the elastic mechanism for adjusting tension in the elastic mechanism by adjusting a length of the elastic mechanism between the first and second ends thereof, the regulation device including a motor connected to the control panel and control system for linearly adjusting the length of the elastic mechanism;
wherein the regulation device includes a linkage assembly having a first portion connected to the motor, a central portion pivotally connected to the elastic mechanism and a second portion slidably connected to a casing of the compensation device.

18. The exoskeleton system of claim 17, wherein the first portion is an arm secured to a screw coupled to the motor and arranged to linearly move in first and second directions according to rotation of the screw to adjust the tension in the elastic mechanism, the second portion secures to a slider disposed along a rail accommodating movement in the first and second directions.

19. The exoskeleton system of claim 18, wherein the central portion comprises a plate securing to a second bracket of the elastic mechanism by a pivot pin such that the second bracket pivots about a third axis of rotation.

* * * * *